US006981332B2

(12) United States Patent
Barefoot

(10) Patent No.: US 6,981,332 B2
(45) Date of Patent: Jan. 3, 2006

(54) INTERNAL WELD PROFILE GAUGE

(76) Inventor: Byron G. Barefoot, 140006 Fitzwater Dr., Nokesville, VA (US) 20181

( * ) Notice: Subject to any disclaimer, the term of this patent is extended or adjusted under 35 U.S.C. 154(b) by 0 days.

(21) Appl. No.: 10/656,163

(22) Filed: Sep. 8, 2003

(65) Prior Publication Data

US 2004/0045180 A1    Mar. 11, 2004

Related U.S. Application Data

(63) Continuation-in-part of application No. 10/036,533, filed on Jan. 7, 2002, now Pat. No. 6,637,121.

(51) Int. Cl.
*G01B 3/50* (2006.01)
*G01B 3/14* (2006.01)
(52) U.S. Cl. .................... 33/501.45; 33/562
(58) Field of Classification Search ............ 33/412, 33/832, 833, 836, 501, 501.08, 501.09, 501.45, 33/535, 555.2, 562, 563, 566
See application file for complete search history.

(56) References Cited

U.S. PATENT DOCUMENTS

| | | | | |
|---|---|---|---|---|
| 1,881,651 A | * | 10/1932 | Judge | 33/562 |
| 2,389,842 A | * | 11/1945 | Cummins | 33/833 |
| 2,603,872 A | * | 7/1952 | Jones | 33/555.1 |
| 3,381,385 A | * | 5/1968 | Wilber | 33/563 |
| 3,597,848 A | * | 8/1971 | Matson | 33/833 |
| 4,485,558 A | * | 12/1984 | Lycan et al. | 33/833 |
| 4,637,142 A | * | 1/1987 | Baker | 33/833 |
| 4,936,019 A | * | 6/1990 | Hirsch | 33/562 |
| 5,285,578 A | * | 2/1994 | Sovereen | 33/562 |
| 5,611,149 A | * | 3/1997 | Fujiwara | 33/833 |
| 6,594,914 B1 | * | 7/2003 | Babcock | 33/535 |
| 6,637,121 B2 | * | 10/2003 | Barefoot | 33/501.45 |

* cited by examiner

*Primary Examiner*—Christopher W. Fulton
(74) *Attorney, Agent, or Firm*—Greenblum & Bernstein, P.L.C.

(57) ABSTRACT

A tool for inspecting and verifying weld beads in a pipeline includes a plate-like structure which has a surface and edges adapted for inspecting and verifying various weld bead attributes. The surface is imprinted with several identification marks, including for example, wall thicknesses and ratios of weld bead width to wall thickness. The tool can be used to verify weld bead convexity, weld bead concavity, and weld bead width for many different wall thicknesses. The tool is capable of verifying weld bead width and axial alignment of successive sections of pipe along the pipeline. All verifications and measurements are visual and tactile, without need for complex machinery or calculations, and can be accomplished with a single, lightweight tool. Additionally, a single tool can be used to verify weld beads for a variety of different pipe thicknesses.

25 Claims, 18 Drawing Sheets

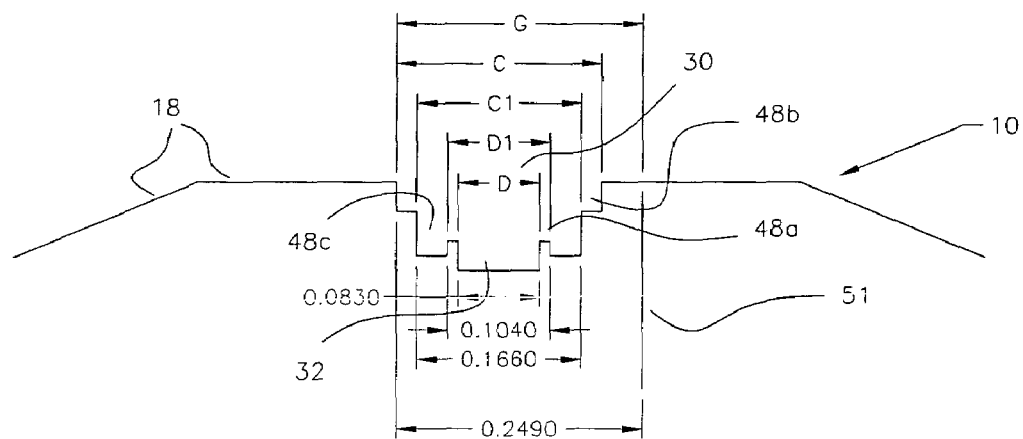
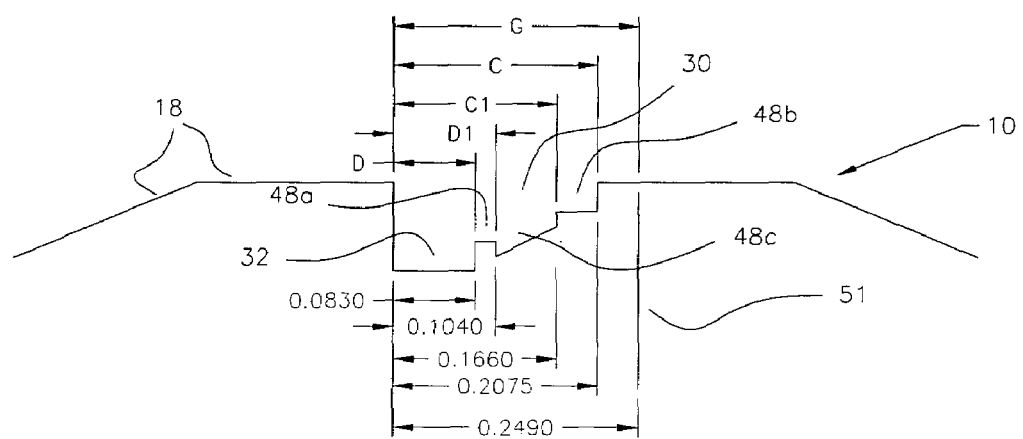
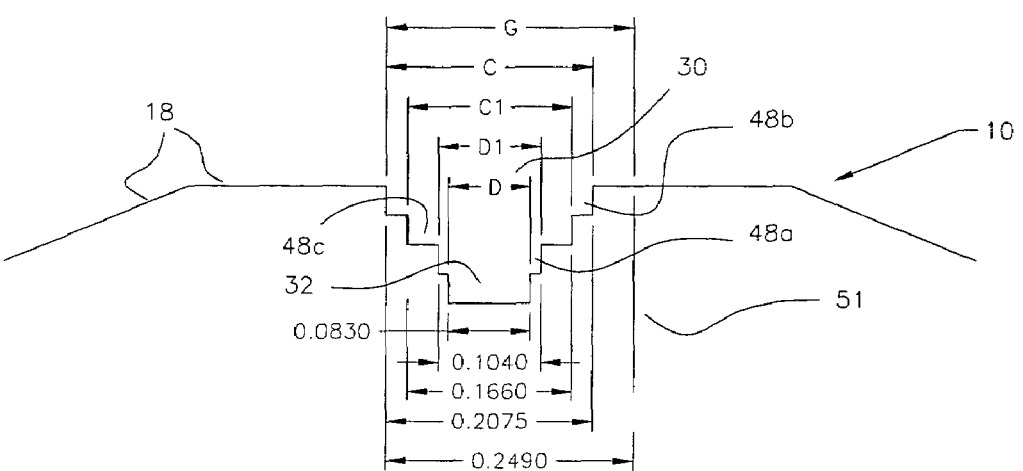

INTERNAL WELD PROFILE GAUGE

CROSS REFERENCE TO RELATED APPLICATIONS

This application is a continuation in part of U.S. application Ser. No. 10/036,533 filed on Jan. 7, 2002 now U.S. Pat. No. 6,637,121, which is now incorporated herein in its entirety.

BACKGROUND OF THE INVENTION

1. Field of the Invention

The invention relates generally to a measurement device and, more particularly, to a measuring device for inspecting and verifying weld profiles.

2. Background Description

Gas tungsten arc welding is used in many different applications to make welds for piping systems. For example, gas tungsten arc welding is used in clean rooms to make welds on pipelines that supply various fluids and gases to the equipment in the clean rooms. One such clean room is for the manufacturing of semiconductor chips and other similar components.

At the present time, many proposed standards are being devised in order to ensure that gas tungsten arc welding meets certain minimum requirements in the clean room and semiconductor environment. These standards will ensure that semiconductor manufacturing applications, for example, operate at peak efficiency. In particular, SEMI™ GTA (gas tungsten arc) task force is currently devising weld standards and tolerances for the gas tungsten arc welds used in semiconductor manufacturing applications. More specifically, SEMI is setting standards for maximum and minimum weld bead convexity, concavity, and width, and maximum and minimum offset from perfect axial alignment of successive pipes in the pipeline.

It is currently theorized that if a weld does not conform to certain tolerances, gas flow over the weld bead will be disturbed potentially resulting in a Venturi effect. The Venturi effect results in a pressure differential over the weld, which, in turn, causes a moisture buildup at the weld bead. This moisture buildup will cause corrosion in the pipe thus introducing impurities into the system. These impurities will reduce semiconductor yield thus causing a reduced manufacturing yield, as well as affecting the integrity of the weld. The same problems occur when successive pipes along the pipeline are axially misaligned. Thus, it is imperative that all welds are within certain strict tolerances so as to minimize yield loss due to misalignment of pipes as well as improper weld beads.

To ensure that the weld bead is within certain tolerances, the welder will make periodic sample welds, or coupons, on the pipeline. A longitudinal cross section of the pipeline will then be cut in order for the welder to measure the weld parameters. That is, the welder will inspect the coupons for penetration, bead concavity, bead variation, oxidation and other variables. These coupons and observations, along with the known diameter and other dimensions of the tungsten tip and pipe, itself, are then used to calibrate the welding machine. Thereafter, the welder can begin the welding process using the calibrated welding machine.

However, in order to measure the weld parameters the welder must use complex and cumbersome devices, even using complex mathematical formulas based on the diameter and wall thickness of the pipe. For example, U.S. Pat. No. 2,603,872 to Jones teaches a gauge for measuring curvature, and a standard micrometer can be used to measure the width of the weld bead. However, these devices are mechanically cumbersome and require complex calculations or manipulations to arrive at a meaningful result. Furthermore, the actual numerical measurement of the weld bead is not as important to the welder as being within certain weld tolerances based on many variables including, for example, the different multipliers multiplied by the pipe wall thickness. Thus, the prior art devices tend to provide irrelevant data to the welder.

Additionally, existing devices are capable of inspecting and verifying only one aspect of the weld bead at a time, thereby requiring the welder to carry multiple cumbersome devices. Consequently, the welder cannot employ existing devices simply and rapidly. Similar problems exist with respect to devices for use in verifying axial alignment of pipes, such as the device shown in U.S. Pat. No. 4,255,860 to Ragettli.

SUMMARY OF THE INVENTION

In one aspect of the invention, a tool is provided for measuring parameters. The tool includes a plate having a surface and a plurality of edges. At least one fixed measurement structure is integrated with an edge of the plurality of edges of the plate. The at least one fixed measurement structure includes a recessed portion and at least one projection extending upward within the recessed portion forming at least one fixed variation measurement structure.

In another aspect of the invention, a method is provided for measuring a maximum and minimum allowable material thickness having a recessed portion with a stepped configuration. The method comprising the steps of placing a first portion of the recessed portion over a thickness of the material; navigating the first portion over portions of the material; determining whether the first portion slips over the thickness of the material and, if so, then the material thickness is within allowable thickness variation; and determining whether the material enters a second, narrower portion of the recessed portion and, if not, then the material thickness is within allowable thickness variation.

In another aspect of the invention, a method is provided for measuring bead overlap. The method includes measuring a bead width at a certain location by placing a structure with edges near the bead; rotating the structure approximately 90 degrees; placing the structure lengthwise across the bead; aligning one of the edges of the structure with an outside edge of a weld bead at about the certain location; and counting an amount of bead overlaps between the edges of the structure.

BRIEF DESCRIPTION OF THE DRAWINGS

FIGS. 13A–13c are exploded views of tool for measuring weld bead width, weld bead variation and downslope;

DETAILED DESCRIPTION OF THE EMBODIMENTS OF THE INVENTION

The invention is directed towards a tool capable of measuring different weld bead and pipe parameters. The tool allows for a considerable reduction in the number and weight of tools required to inspect and verify an internal weld. Furthermore, the tool eliminates the need for complex mechanisms or calculations and makes the inspection and verification process purely visual and tactile. This greatly simplifies the weld inspection and verification process.

Figure 1:
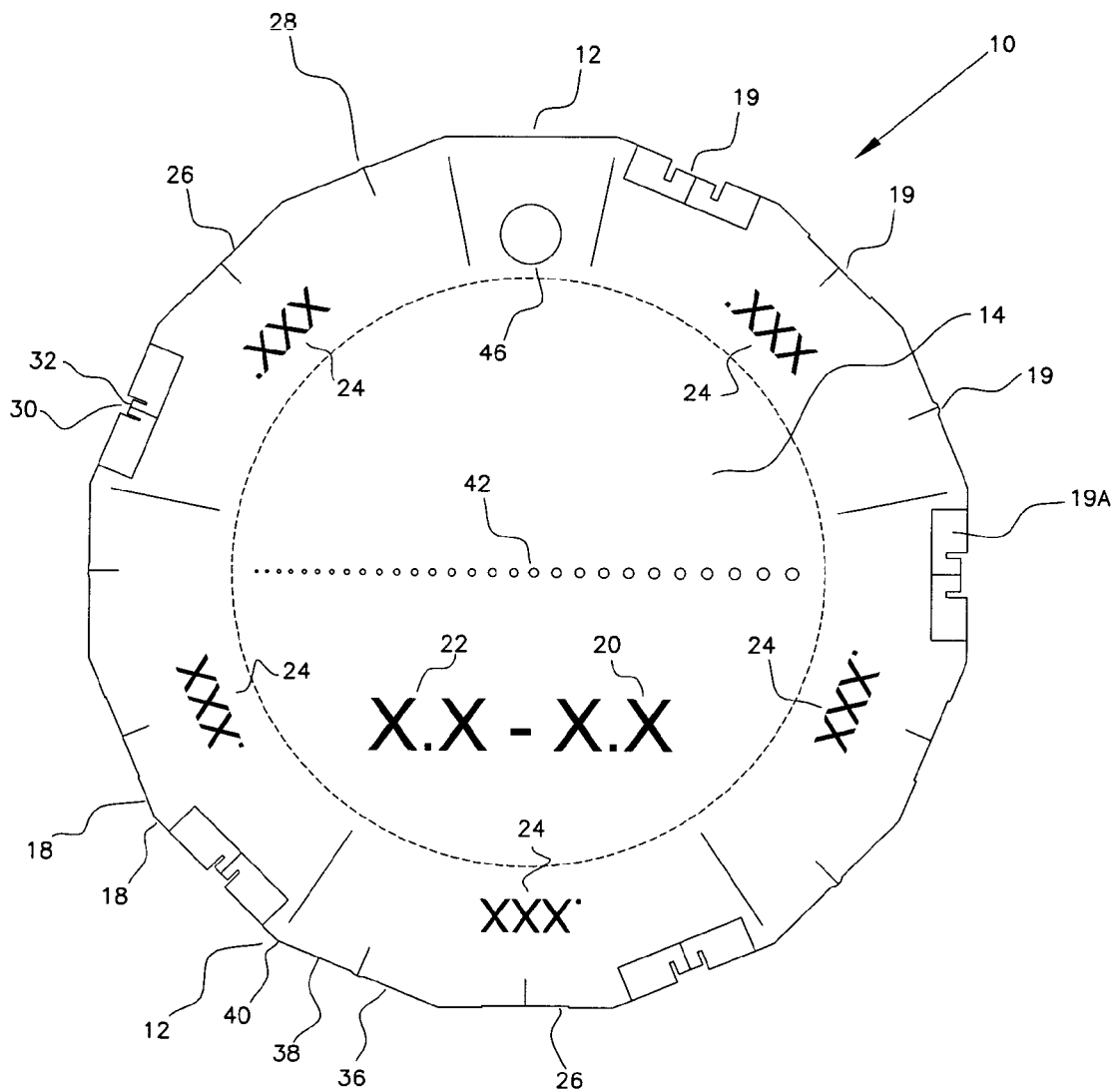
FIG. 1 is a top plan view of a first embodiment of the measuring and inspection tool of the invention.

Referring now to FIG. 1, a tool generally depicted as reference numeral 10 is provided for inspecting and verifying internal weld beads. In one exemplary embodiment, the tool 10 is shown as a plate 12 with first and second opposing surfaces 14 and edges 18. Edges 18 are adapted for inspecting and verifying various characteristics of a weld bead by integrating a fixed measurement structure 19 (maximum and minimum measurement structure) with edge 18. In the embodiments of the invention, surface 14 of plate 12 is imprinted by any known means with a maximum bead width multiplier 20, a minimum bead width multiplier 22, and one or more wall thickness numerals 24 corresponding to different pipe wall thicknesses of the pipe. Additional indicia may be imprinted on opposing surface 14. At least one edge 18 with integrated fixed maximum and minimum measurement structure 19 is associated with each wall thickness numeral 24. The measurement structure 19 may be associated with a predetermined job site specification or a known maximum and minimum multiplier.

In the embodiment of the invention illustrated by FIG. 1, surface 14 is imprinted with five wall thickness numerals 24, and each wall thickness numeral 24 is associated with three edges 18 adapted with integrated fixed maximum and minimum measurement structures 19, so that plate 12 has sixteen edges 18 and is substantially circular in shape. It should be understood by those of ordinary skill in the art, however, that each wall thickness numeral 24 may equally be associated with one or two integrated fixed maximum and minimum measurement structures 19. Also, tool 10 may be other shapes such as square, rectangular or other polygonal shape, depending on the integrated fixed maximum and minimum measurement structures 19. See, for example, FIG. 5 which shows a rectangular shaped tool.

In the embodiment of FIG. 1, tool 10 can be used to inspect and verify three weld characteristics. The embodiments of the invention, distinguished from each other by their maximum and minimum bead width multipliers 20 and 22, respectively, or a predetermined job site specification, are adapted to inspect and verify bead convexity, bead concavity, and bead width for five different wall thicknesses. For example, the exploded view of FIG. 2 shows a fixed maximum measurement structure 19 to verify that the convexity of the weld bead is within the proper tolerances.

Figure 2:
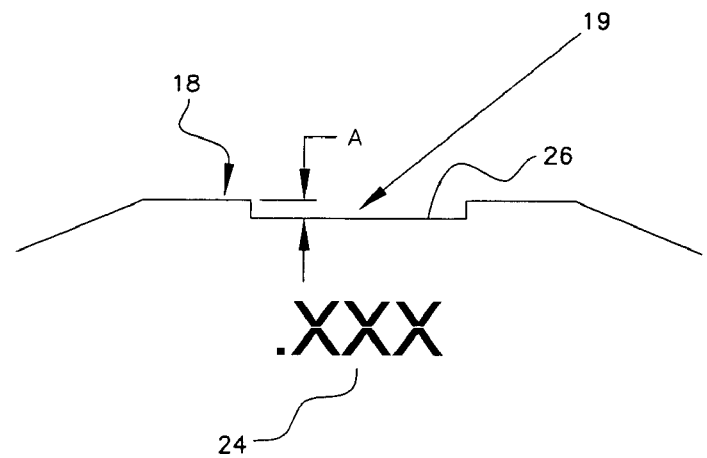
FIG. 2 is an exploded view of a notch for determining convexity of the weld beads.
Figure 3:
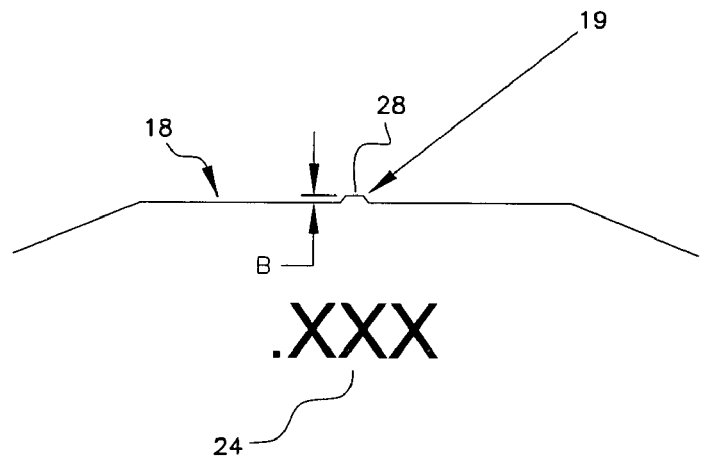
FIG. 3 is an exploded view of a tooth for determining concavity of the weld beads.
Figure 4:
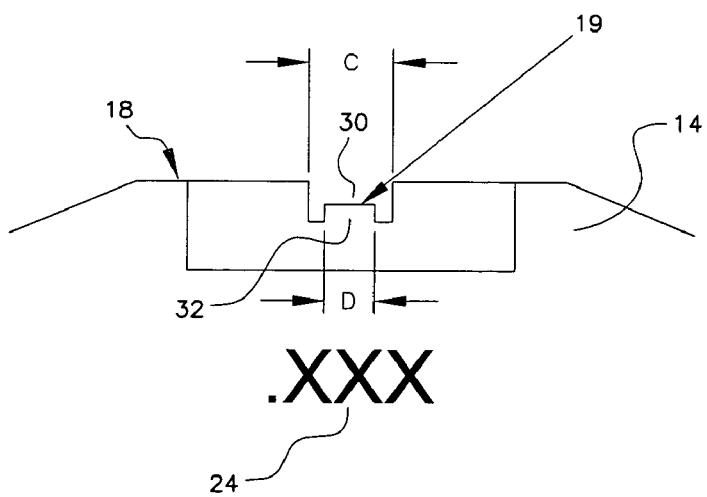
FIGS. 4–4b are exploded views of a gap and tab for determining width of the weld beads.

FIGS. 2–4 show three different fixed maximum and minimum measurement structures 19 adapted for use with the present invention. In FIG. 2, a fixed maximum convexity measuring device is shown. A notch 26 is cut into edge 18 in order to verify that the convexity of the weld bead is within proper tolerances (i.e., the convexity of the weld bead has not exceeded a maximum defined convexity). In an embodiment of the invention, the depth "a" of notch 26 is substantially equal to ten percent of the wall thickness numeral 24 associated with edge 18; however, other depths are also contemplated by the present invention such as, for example, a fixed number defined by a job specification.

In use, the notch 26 is placed over the internal weld bead. The weld bead is within tolerance if tool 10 does not rock (i.e., remains stationary). On the other hand, the weld bead is not within tolerance if tool 10 rocks (i.e., is not stationary). The latter scenario shows that the convexity of the weld bead projects higher than substantially 10% of the wall thickness. In this manner, the welder can quickly and easily determine whether the convexity of the weld bead is within the proper tolerances.

FIG. 3 shows a fixed maximum device for verifying the concavity of the internal weld bead. In FIG. 3, a tooth 28 protrudes from edge 18 by dimension "b." In the embodiment of the invention, dimension "b" is substantially equal to ten percent of the wall thickness numeral 24 associated with edge 18; however, other dimensions are also contemplated by the present invention. For example, it is also contemplated that tooth 28 will have dimension "b" of one one-thousandth (1/1000) of an inch to detect the presence of any concavity in the weld bead.

In use, the tooth 28 is placed over the weld bead. The weld bead is within tolerance if tool 10 rocks (i.e., is not stationary). On the other hand, the weld bead is not within tolerance if tool 10 does not rock (i.e., remains stationary). The latter scenario shows that the concavity of the internal weld bead is at a depth lower than substantially 10% of the wall thickness or other predefined measurement. In this manner, the welder can quickly and easily determine whether the concavity of the weld bead is within proper tolerances.

FIG. 4 illustrates the integrated fixed maximum and minimum measurement structure 19 used to verify a width of the internal weld bead. A gap 30 and a tab 32 are disposed along edge 18. The width of gap 30, indicated by dimension "c," is substantially equal to the associated wall thickness numeral 24 multiplied by maximum bead multiplier 20. Accordingly, the dimension "c" represents the maximum allowable bead width. The width of tab 32, indicated by dimension "d," is substantially equal to the associated wall thickness numeral 24 multiplied by minimum bead multiplier 22. Accordingly, the dimension "d" represents the minimum allowable bead width. The width of gap 30 and tab 32 (e.g., dimensions "c" and "d") may also be based on a fixed number defined by a job specification.

In use, by placing gap 30 and tab 32 over the weld bead, the welder can ensure that the bead width is within the proper tolerances. That is, the bead width should be equal to or wider than tab 32 but equal to or narrower than gap 30. In an embodiment of the invention, gap 30 and tab 32 are of a contrasting color to the remaining portion of tool 10 to facilitate easy identification of the weld. By way of example only, this contrasting color can be achieved by etching and recessing gap 30 and tab 32 from surface 14, as shown as reference numeral 19a in FIG. 1. The gap 30 and tab 32 may also be recognized by other identifying features, such as a line.

Figure 4A:
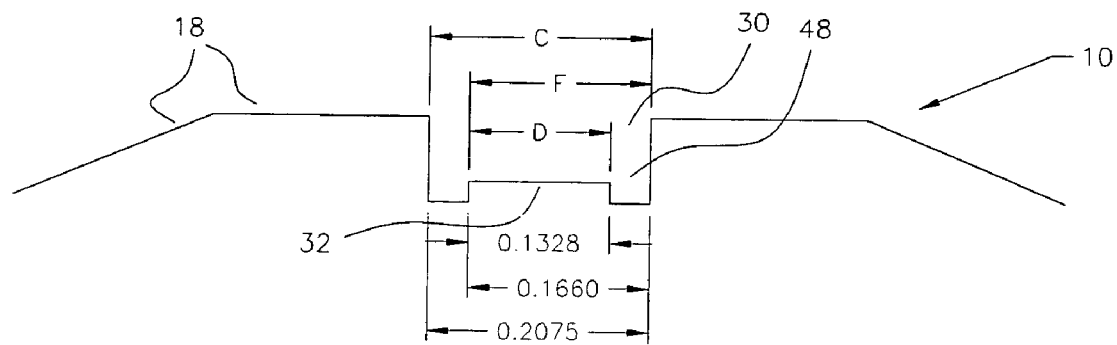

FIG. 4a includes an added weld bead variation dimension F. The dimension F is shown from the left side of tab 32 to the right side of gap 30. Of course, it should be obvious to those of skill in the art that dimension F can be reversed since the tab 32, in one embodiment, is centered on gap 30. As should now be understood, in one embodiment, in use, if the weld bead width is the size of tab 32 (e.g., dimension D), then the maximum weld bead width cannot be greater than dimension F.

Figure 4B:
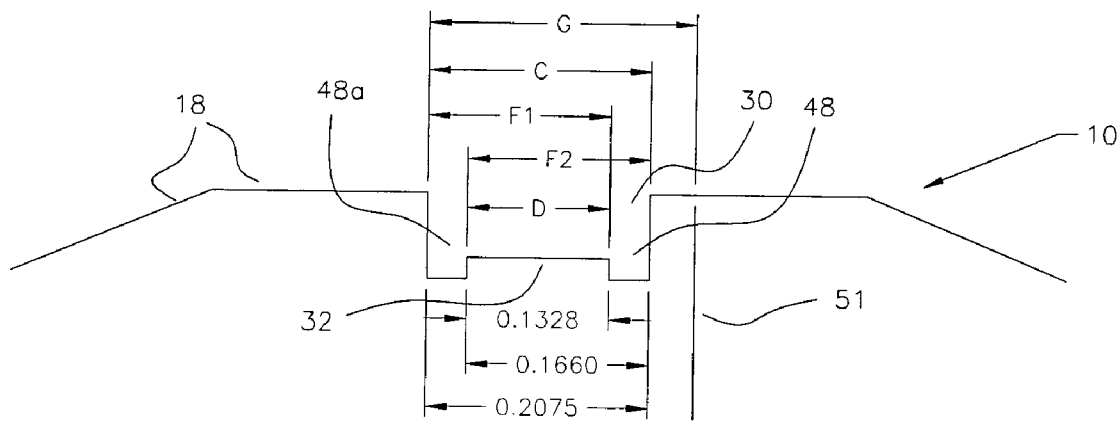

FIG. 4b includes weld bead variation dimensions F1 and F2. In one implementation, the dimensions F1 and F2 could be the same dimension, or tab 32 could be offset a predetermined amount to the right side of center of gap 30 so that dimension F1 would be larger than dimension F2. The dimension F2, in other implementations, can alternatively be larger than the dimension F1, depending on the application of use. The dimensions F1 and F2 are designed to measure the maximum weld bead variation (e.g., left side of gap 30 to right side of tab 32) of a minimum or maximum of a weld bead width. For example, in use, if the weld bead width is as wide as dimension D (e.g., minimum weld bead width) then the maximum weld bead width variation cannot exceed either dimension F1 or dimension F2, depending on the weld bead width multiplier. For example, the smaller variation dimension F1 or F2 would be associated with the smaller wall thickness multiplier. Also, if the maximum weld bead width is dimension C, for example, then the maximum weld bead width variation cannot exceed either dimension F1 or dimension F2 from the maximum weld bead width dimension C. The larger of the Dimensions F1 or F2 will pertain to the dimension C.

FIG. 4b also shows a minimum downslope (automatic arc welding downslope) measurement marking 51. (Downslope is a distance created from the time during which the welding current is reduced continuously from the final level until the arc is distinguished.) The downslope line 51 is established to the right side of weld bead width gap 30 and is a particular distance G (e.g., 3×wall thickness) from the left side of gap 30. This measurement can equally be represented from the right side of the gap 30. In one implementation, the minimum downslope distance is established by multiplying 3 times, for example, the material wall thickness (or any other multiplier or fixed number). The correct downslope distance is determined by cutting open a weld coupon and marking the end of the weld downslope on the outside of the pipe and then marking the end of the weld downslope on the inside of the pipe. The marks are transferred to the end of the pipe. The correct wall thickness is selected on the tool 10 and by placing the left side of gap 30 on the left weld downslope mark then verifying that the right downslope mark is equal to or greater than distance of the downslope line 51 (dimension G).

Figure 5:
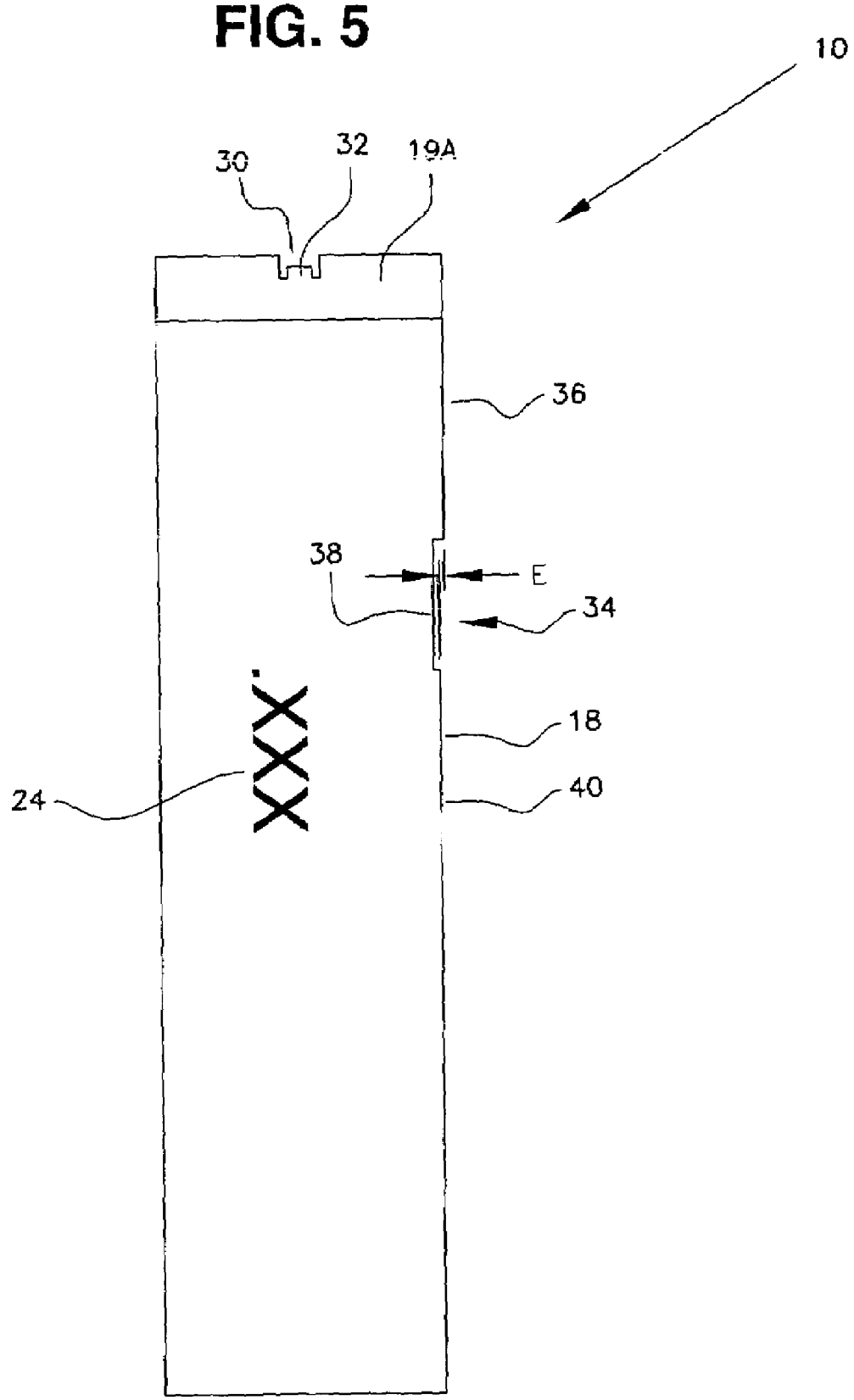
FIG. 5 is a diagram of the axial alignment feature of the measuring and inspection tool.

FIG. 5 shows another embodiment of the present invention specially adapted to inspect and verify bead width and pipe axial alignment. In this embodiment, axial alignment of pipe sections along the pipeline can be verified by using the integrated structure 34. Edge 18 includes an axial alignment gauge 34 having an upper portion 36, a recessed portion 38, and a lower portion 40. Upper portion 36 is higher than lower portion 40 by dimension "e." In the embodiment of the invention, dimension "e" may be substantially equal to ten percent of the associated wall thickness numeral 24. The dimension "e" may, of course, be other percentages of the wall thickness numeral or other fixed dimension. Proper axial alignment can be verified by placing recessed portion 38 across the seam between two sections of pipe. If the pipes are aligned within proper tolerances, tool 10 will rock about the seam. If the pipes are not properly aligned, tool 10 will be unable to rock.

In use, the tool of FIG. 5 should be placed at a minimum of at least two positions over the weld bead in order to determine the axial alignment of the pipes. In a first position, for example, the tool will be placed over the weld bead with the recessed portion 38 positioned over the weld bead. If the tool rocks, the tool will then be rotated 180 degrees with the recessed portion 38 placed over the same position of the weld bead. If the tool still rocks, then it is verified that the pipes are in axial alignment. This same procedure may be used in other locations of the wed bead (preferably at 90 degree increments) in order to determine the axial alignment of the pipes about the diameter thereof. The tool can also be used in the same manner prior to the welding process as a pre-weld inspection for alignment of the adjoining tubes. This procedure assumes that the outside diameters of joined pipes are within tolerances of one another.

Figure 6:
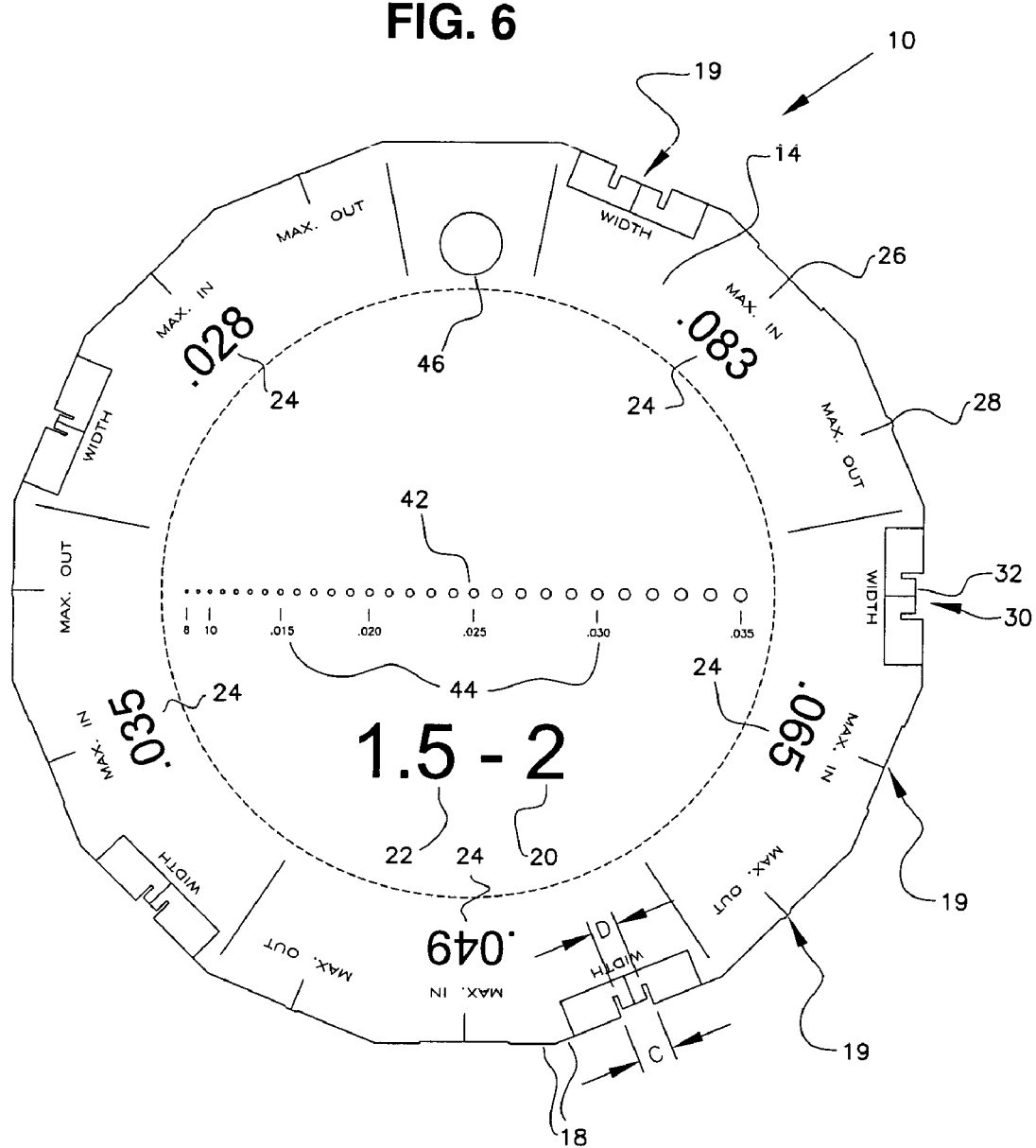
FIG. 6 is an exemplary embodiment of the measuring and inspection tool.

FIG. 6 illustrates a specific example of tool 10 adapted to inspect and verify bead convexity, bead concavity, and bead width for the common wall thicknesses of 0.028 inches, 0.035 inches, 0.049 inches, 0.065 inches, and 0.083 inches, where the ratio of bead width to wall thickness is between 1.5 and 2, inclusive. As shown in FIG. 6, the embodiment of tool 10 also includes several holes 42 of varying diameter as well as corresponding diameter markings 44 imprinted onto surface 14. By inserting the tip of an electrode into successive holes 42, the welder can determine the diameter of the tip. The use of commonly sized tips allows for a constant voltage to be used during the weld process so as to maintain a constant weld bead. Tool 10 can also include a hole 46 that allows tool 10 to be conveniently stored, such as on a keychain, when not in use.

Figure 7:
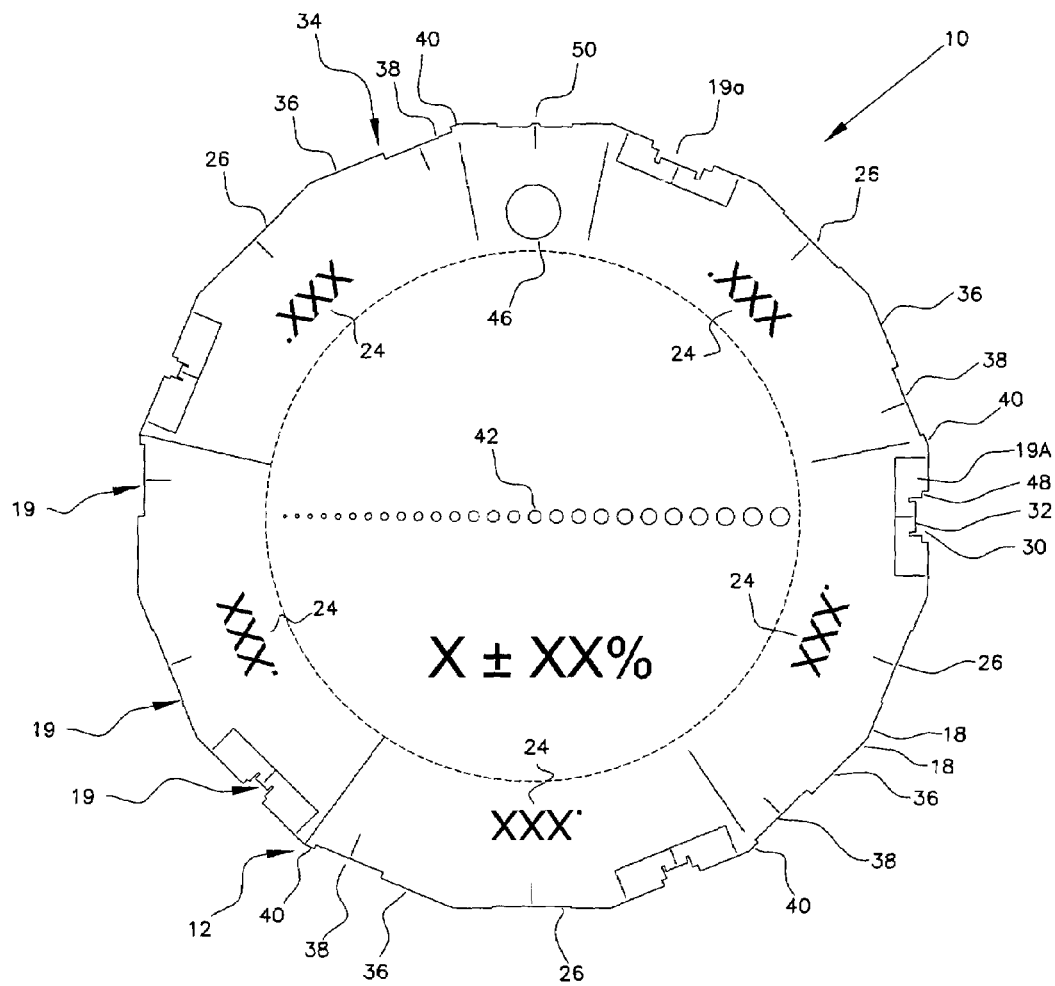
FIG. 7 is a top plan view of another embodiment of the measuring and inspection tool of the present invention.

A second embodiment of the tool 10, which is substantially similar to the embodiments shown in FIGS. 1 and 6, is shown in FIG. 7. For example, each wall thickness numeral 24 is associated with three fixed measurement structures 19, one of which is a convexity measuring notch 26 as shown in FIG. 2 and described above. A second measurement structure 19 is an axial alignment structure 34, as shown in FIG. 5 and described above. A third measurement structure 19 is used to verify the width of the internal weld bead, including gap 30, tab 32, and a tolerance step 48. This width-measuring structure is shown in exploded view in FIG. 8. As described above with reference to FIG. 4, dimensions "c" and "d" denote the maximum and minimum widths of the internal weld bead, respectively. Step 48 indicates the acceptable variation in the width of the weld bead. Dimension "f" may be a fixed percentage variation from dimensions "c" and "d," associated with a predetermined job site specification, or some other appropriate dimension.

FIG. 7 also shows that tool 10 includes a concavity measuring nub 50. Concavity measuring nub 50 functions similarly to tooth 28 (shown in FIG. 3). However, rather than being associated with a particular wall thickness numeral 24, nub 50 is adapted to measure a fixed maximum concavity (e.g., 1/1000 of an inch) for all pipe wall thicknesses.

Figure 7A:
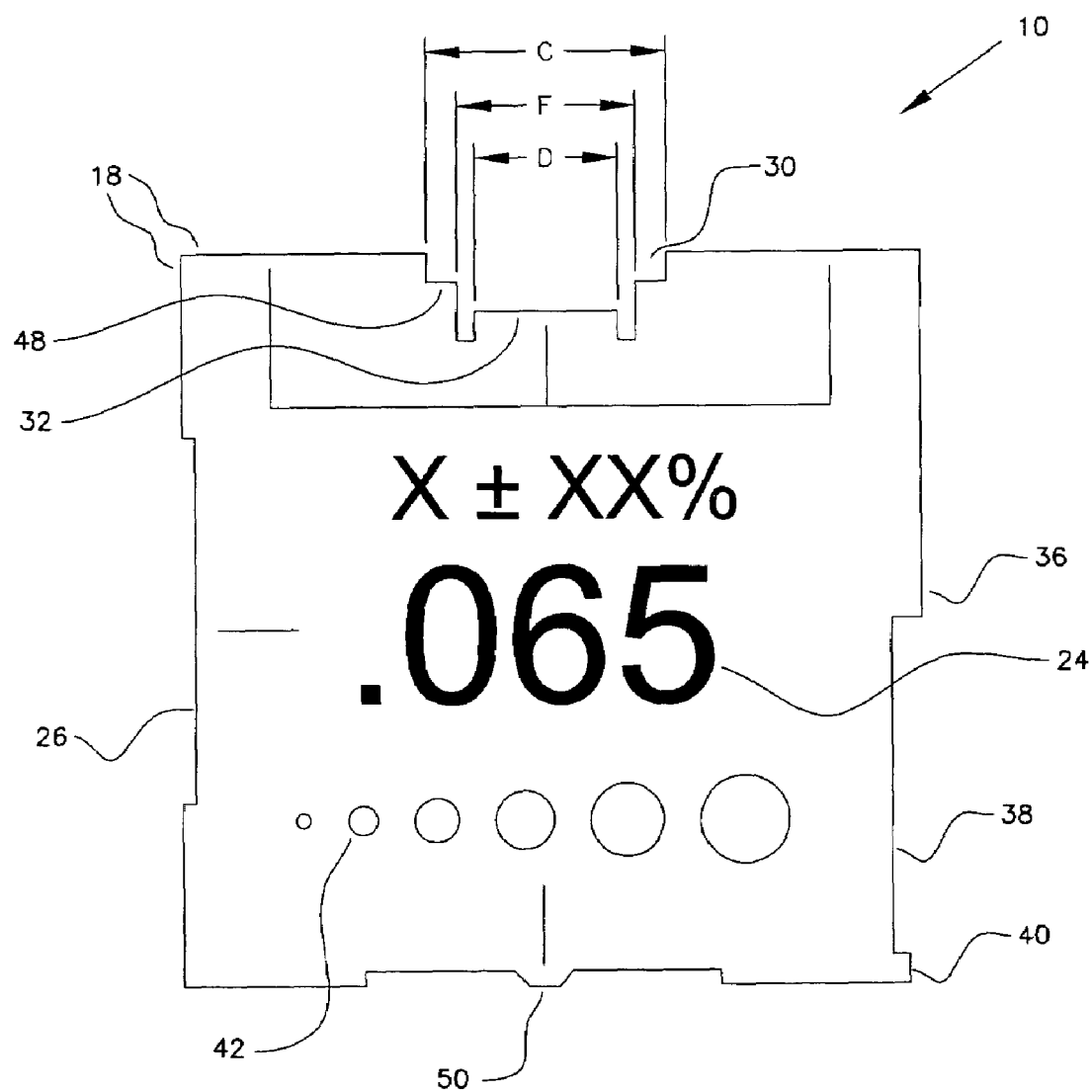
FIG. 7a is a top plan view of a third embodiment of the measuring and inspection tool of the present invention.

A third embodiment of tool 10 is shown in FIG. 7a. This embodiment is similar to the embodiment shown in FIG. 7, but is for use with only a single wall thickness of pipe as indicated by imprinted wall thickness numeral 24. That is, the embodiment of tool 10 shown in FIG. 7a is adapted to measure maximum bead width, minimum bead width, bead width variation, bead concavity, bead convexity, axial tube alignment for a single pipe wall thickness. Tool 10 may also include holes 42 for measuring tip diameters as described above with reference to FIG. 6. This third embodiment of tool 10 is smaller than the embodiments shown in FIGS. 1 and 7, and accordingly may be used in smaller or more confined spaces.

Measurement of the bead width via gap 30 and tab 32 is as described above with reference to FIG. 4. To use the modified width measurement structure 19 shown in FIG. 8 to measure bead width variation, gap 30 and tab 32 are placed over the weld bead and moved along its length. If the maximum weld bead width is dimension "c," then the minimum bead width must not be smaller than dimension "f." If the maximum bead width is dimension "f," then the minimum bead width must not be smaller than dimension "d." That is, step 48 acts as a reference gauge allowing the welder to verify not only that the absolute bead width is within proper tolerances, but also that the variation in bead width is within proper tolerances.

Figure 8:
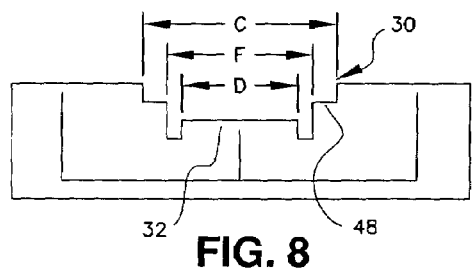
FIGS. 8–8c are exploded views of a gap, tab, and tolerance step for determining width of the weld beads and the variation thereof.
Figure 8A:
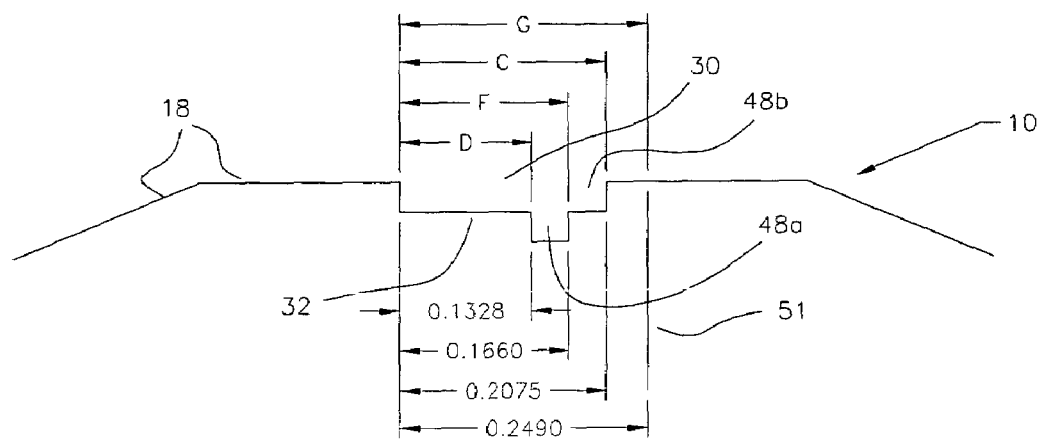
Figure 8B:
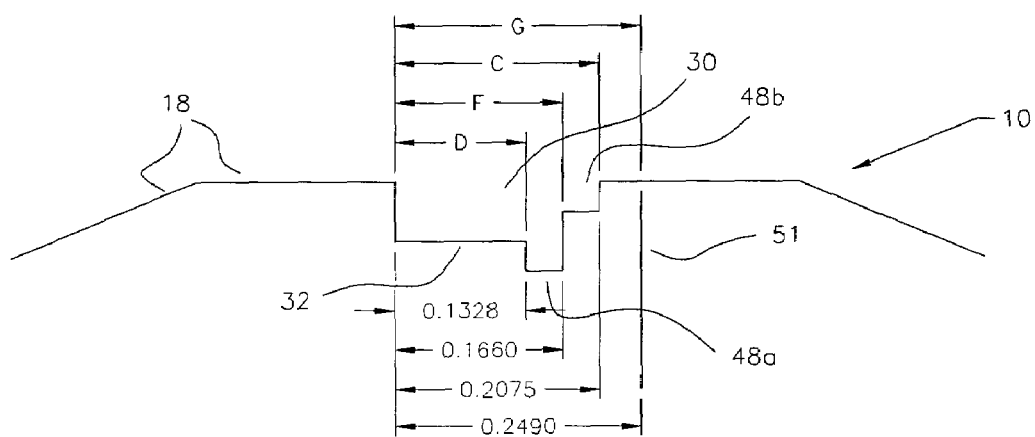
Figure 8C:
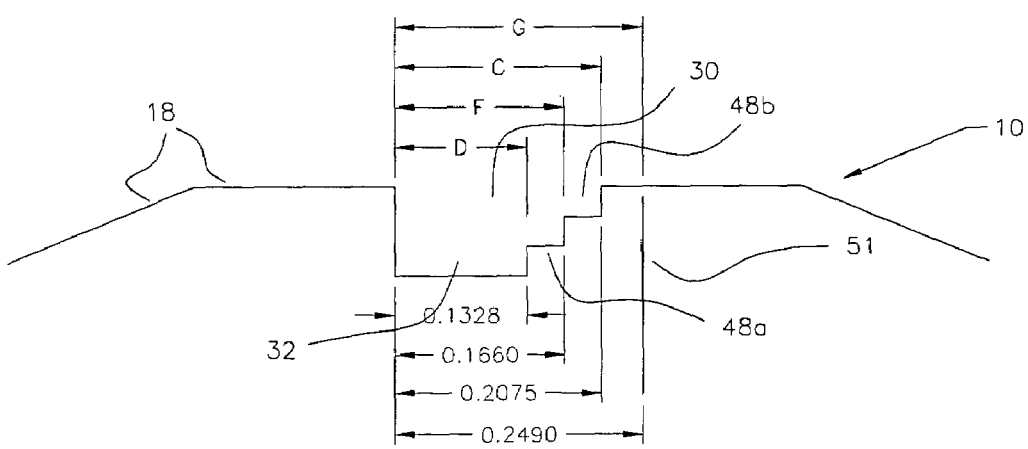

FIGS. 8a through 8c are three illustrations similar to FIG. 8. These views show alternative ways of measuring the maximum and minimum widths of the internal weld bead. As seen in these Figures, tab 32 is now eliminated and a recessed or step configuration is provided. In FIG. 8a there is a shallow recessed area 32 and in FIG. 8b there is provided a deeper recessed configuration. In use, the measurements are made from one side of gap 30. In FIG. 8c, there is one recessed area 32 with two steps 48a and 48b. A minimum downslope measurement marking 51 is provided on each of these illustrations. The dimensions shown in FIGS. 8a–8c are representative of only one set of dimensions and should not be considered a limiting feature of the invention, as is also with any other specific dimensions shown and described herein.

In the variations of FIGS. 8a through 8c, in use, to measure bead width variation, the structure is placed over the weld bead and moved along its length. If the maximum weld bead width is dimension C, then the maximum bead width variation should not exceed dimension F. If the maximum bead width is dimension F, then the maximum bead width variation should not exceed beyond dimension D. Alternatively, if the minimum bead width dimension is D, then the maximum bead width variation should not exceed dimension F.

FIGS. 13a through 13c are weld bead variation measurement devices for all wall thickness, e.g., regardless of a wall thickness multiplier. For example, the measurement devices of FIGS. 13a–13c can measure weld bead variations for all wall thickness multipliers such as a minimum weld bead with of 1×wall thickness and maximum of 2.5×wall thickness. By way of one illustration, dimension D may be a minimum weld bead dimension and dimension $D_1$ would then be the maximum weld bead variation dimension (e.g., the weld bead can be any width within the space as represented by reference numeral 48a). Similarly, if dimension C is the maximum weld bead dimension, then dimension $C_1$ would be the maximum weld bead variation dimension (e.g., the weld bead can be any width within the space as represented by reference numeral 48b). The tool of FIGS. 13a–13c also includes the downslope measurement marking 51.

Figure 14A:
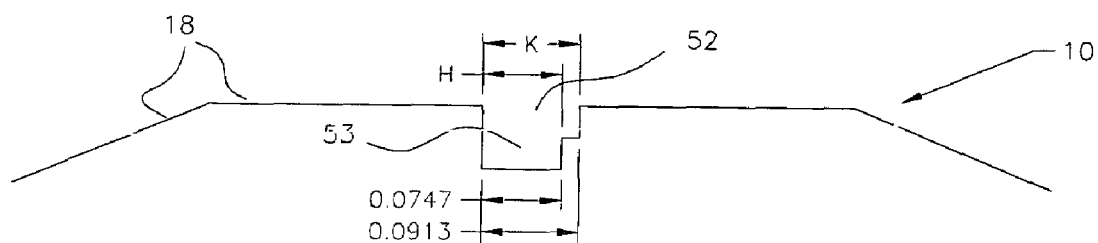
FIGS. 14a and 14b are views of a tool to measure thickness of material to be welded.
Figure 14B:
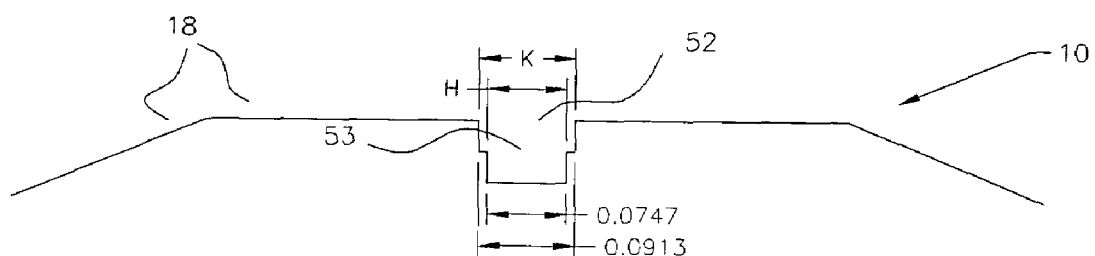

FIGS. 14a and 14b show structures for measuring thickness of material to be welded and to verify that the material thickness meets specifications. In the representation of FIGS. 14a and 14b, the dimension K is the maximum allowable material thickness of a specific specified thickness of the material. For example, if the specified material thickness is 0.083 of an inch, then the maximum allowable material thickness can vary to dimension K, which may be set at, for example, 10% of the specified material thickness or 0.0913 of an inch. The dimension H will measure the minimum material thickness, much like that illustrated with reference to dimension K.

In use, the following steps may be implemented to measure a maximum and minimum allowable material thickness:

1. Select area of tool for material thickness anticipated;
2. Place the first recessed area 52 of tool 10 over the thickness of the material to be welded;
3. If the first recessed area 52 slips over the thickness of the material, it known that dimension K is not exceeded and the material is not to thick;
4. Continue to push tool to bottom of the first recessed area 52; and
5. If material does not fit into the second recessed area 53, it is known that the dimension H is not exceeded and the material is not to thin.

The above steps verify that the material to be welded is within tolerances K and H and meets the specifications. On the other hand, if the first recessed area 52 will not slip over the thickness of the material to be welded, this verifies that the material exceeds the thickness of dimension K and does not meet the specification. Furthermore, if the recessed area 52 slips over the thickness of material to be welded and also continues into the second recessed area 53, it is known that the minimum material thickness dimension H has been exceeded and does not meet the specification.

Figure 15:
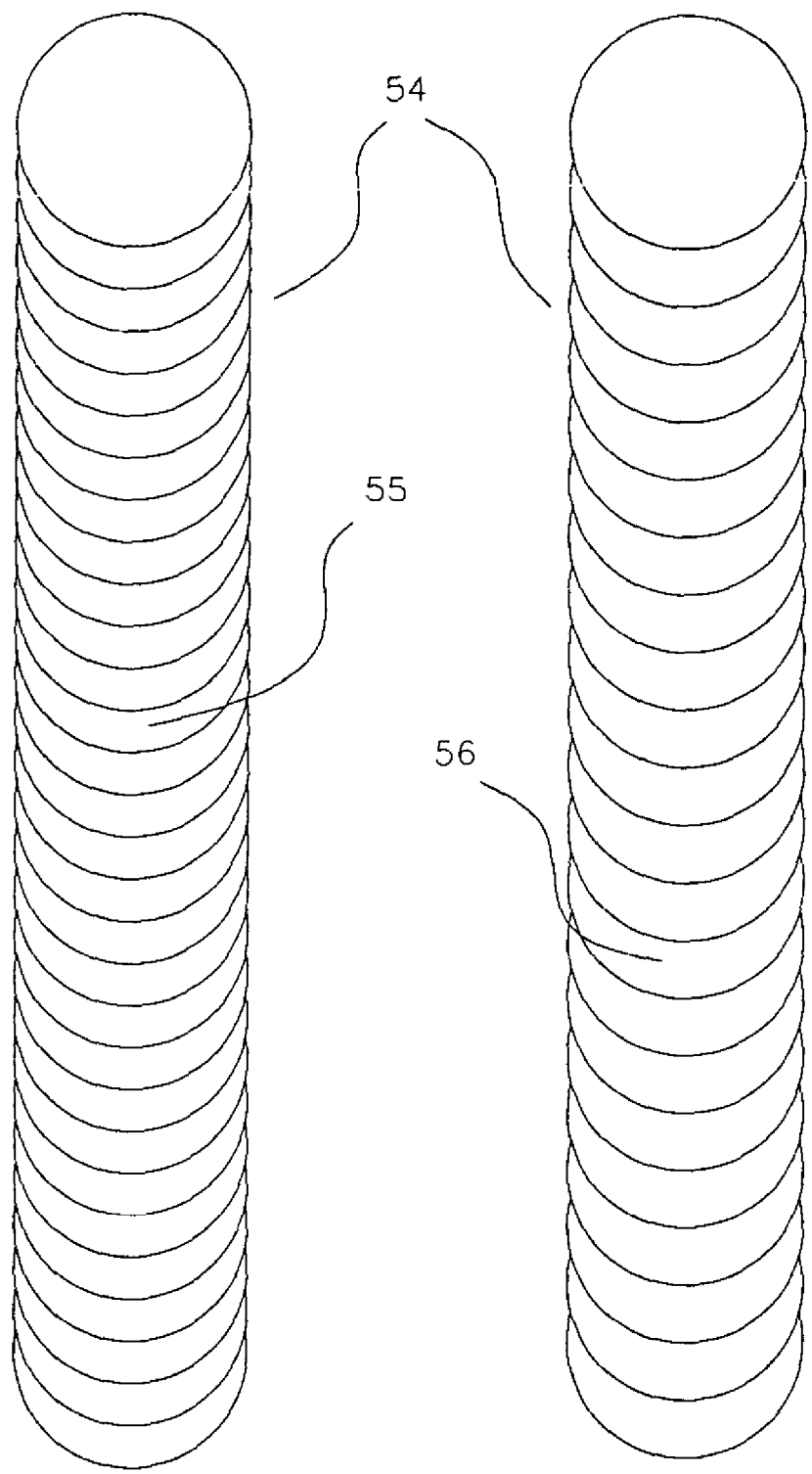
FIG. 15 shows a view of weld bead overlap.

FIG. 15 shows weld bead overlap. By way of reference to FIG. 15, the weld beads can be used to demonstrate how the tool can be used to verify that a minimum weld bead over lap such as an 80% overlap, for example, is being maintained. In the illustration of FIG. 15, the weld bead 55 meets the minimum 80% weld bead over lap and the weld bead 56 does not meet the minimum 80% weld bead over lap. In one implementation, a semi specification requirement requires a minimum of 70% weld bead overlap on the root or ID weld bead and 80% weld bead overlap on the OD weld bead.

Figure 16A:
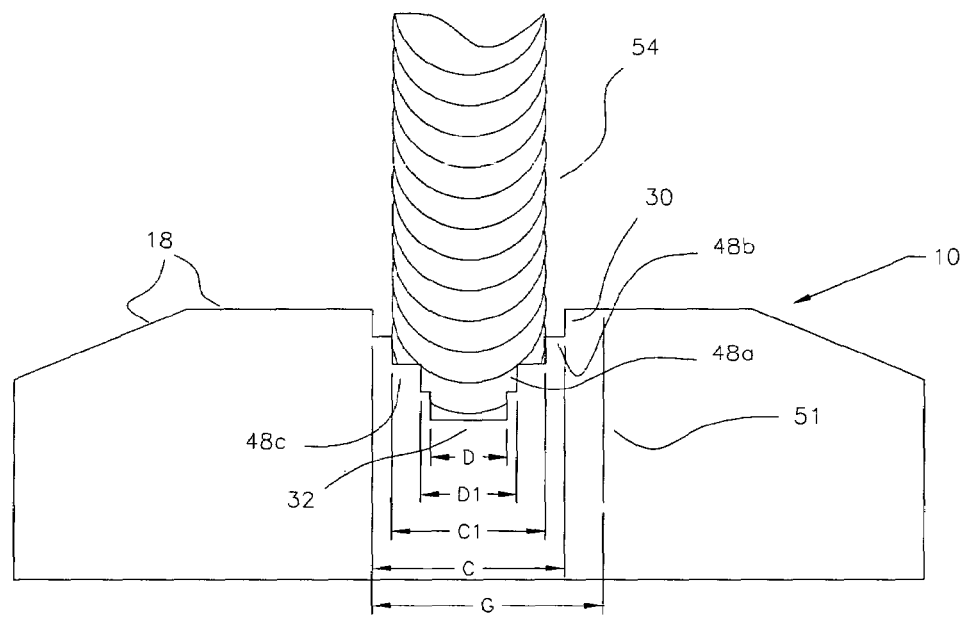
FIGS. 16A–16C show a tool for measuring weld bead overlap.
Figure 16B:
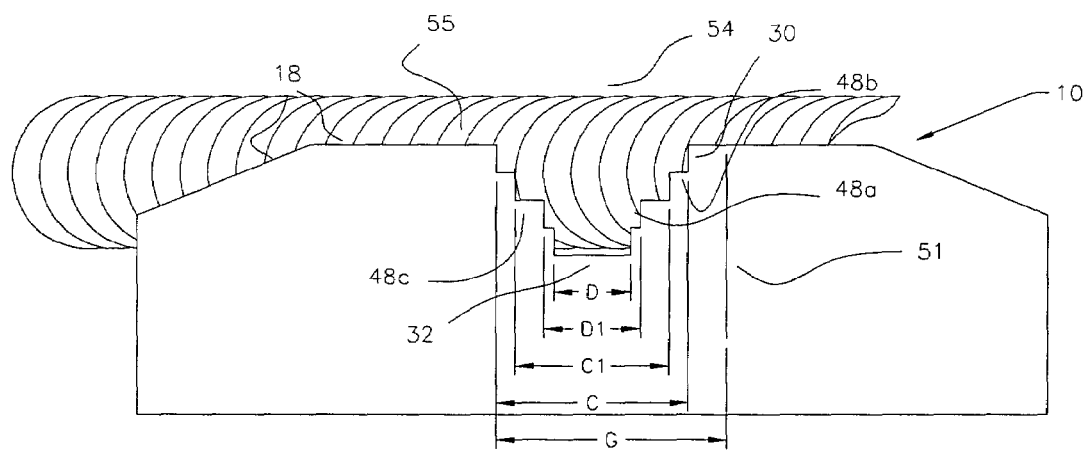
Figure 16C:
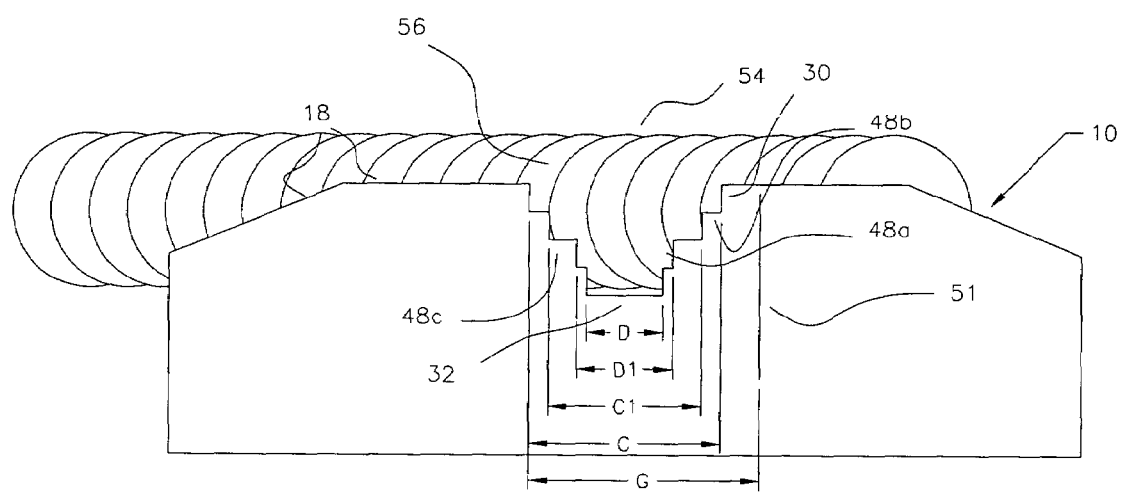

FIGS. 16a through 16c show the use of the tool to measure weld bead overlap. For illustration purposes, a minimum of at least an 80% weld bead overlap is used; however, it should be understood that this tool can be adapted to any other overlap requirement. It should be noted that the bead width variation tool, as shown, for example, in FIG. 13c may be adapted for use in the measurement of the overlap. Other structures may also be adapted to measure the overlap, as should now be understood by those of skill in the art after reading this disclosure. At an 80% weld bead overlap, a minimum of at least five weld beads should be provided.

In this implementation, any one of the dimensions D, $D_1$, $C_1$, C or G may be used to compare to the weld bead overlap. In use, to determine proper weld bead overlap, it is necessary to first determine the width of the weld by using one of the dimensions D, $D_1$, $C_1$, C or G (or other dimensions) and then applying that same width dimension over the length of the weld bead. Then, the number of weld beads is counted within the width dimension to determine a proper overlap. For example, as shown in FIG. 16a, dimension $C_1$ represents a weld bead width at a particular location. The tool is then rotated about 90 degrees, at that same location, and placed in substantially the center of the weld and with the left side line of dimension $C_1$ aligned with an outside edge of the weld bead, as shown in FIG. 16b. In an 80% overlap specification, there should be at least five weld beads within the width dimension as measured from the line of dimension $C_1$, as shown in FIG. 16b. This verifies that there is at least an 80% weld bead overlap and meets the specification.

FIG. 16c shows weld bead overlap that does not meet the required specification, as used in the above manner. In the implementation, there are less then five weld beads for dimension $C_1$. This verifies that the weld bead overlap does not meet the specification.

The tool 10 can also be made to a specific thickness so that the tool can be used to verify a gap in the joint to be welded does not exceed a certain dimension. For example, the tool can be made at a thickness of 0.007 inches to measure a dimension of, for example, 0.006 inches. If the tool 10 cannot be pushed into the joint to be welded it will then verify a clearance less than 0.007" such that the gap meets specification. If the tool 10 can be placed into the joint to be welded, this verifies that the joint to be welded is greater than 0.006 inches and that the gap exceeds the specification.

Combinations of the structures can also be combined such as, for example, the structure 19 and 26, shown in FIG. 26, can be placed in one structure. By way of example, structure 26, a structure for measuring convexity, may be combined with a portion of the structure 19, which measures bead width.

Method of Use

This section is not limited to the uses as described herein. Additional uses and implementations of the invention are provided above with reference to specific figures. Thus, the following uses should not be considered, in any manner, limiting features of the invention and are provided for illustrative purposes.

By way of example, acceptable weld bead width variations are determined by multiplying the minimum weld bead width dimension times a known factor such as, for example, 1.25. The following steps may then be used to establish the allowable weld bead variation dimensions that would be used on tool 10.

1. Determine the minimum and maximum weld bead width multipliers (20 and 22). In FIGS. 4a, 4b, 8a, 8b and 8c, the minimum weld bead width multiplier (22)=1.6 and the maximum weld bead width multiplier (20)=2.5. In FIGS. 13a, 13b and 13c, the minimum weld bead width multiplier (22)=1 and the maximum weld bead width multiplier (20)=2.5

2. Determine the material thickness (24) to be welded. This may be, for example, provided as 0.083".

3. Establish the minimum weld bead width dimensions (D) (Material thickness (24)×the minimum weld bead width multipliers (22) and (20). For example,
   a. the minimum weld bead width dimension (D) for FIGS. 4a, 4b, 8a, 8b and 8c is 0.083"×1.6=0.1328"
   b. the minimum weld bead width dimension (D) for FIGS. 13a, 13b and 13c is 0.083×1=0.083".

4. Establish the maximum weld bead width dimensions (C) (Material thickness (24)×the maximum weld bead width multiplier (20). For example, the maximum weld bead dimensions for FIGS. 4a, 4b, 8a, 8b and 8c and FIGS. 13a, 13b and 13c is 0.083×2.5=0.2075"

5. Establish the maximum weld bead variations (F) using the minimum and maximum weld bead width dimensions (D and C) established in steps 3 and 4, above. For example,
   a. the allowable variation of a minimum weld bead width (F and F1) is 0.1328"×1.25=0.1660" and thus the minimum bead to maximum variation is 0.1328" to 0.1660" (D to F)
   b. the allowable variation of a minimum weld bead width (F and F1) is 0.083×1.25=0.1040 and thus the minimum bead to maximum variation is 0.083" to 0.1040" (D to F1).

Similarly, the allowable variation of a maximum weld bead width is 0.2075" divided by 1.25=0.1660" and thus the allowable variation from the maximum bead width is 0.2075" to 0.1660" (i.e., dimensions (C to F ), (C to F2) or (C to C1)).

By way of another implementation and example, selection of the proper tool 10 for a particular inspection is based on the desired ratios of weld bead width to pipe wall thickness, which is indicated by maximum and minimum bead width multipliers 20 and 22 imprinted on surface 14. Selection of the proper edges 18 to use for inspection and verification is accomplished by matching the thickness of the pipe wall to one wall thickness numeral 24 imprinted on upper surface 14.

For example, a measurement of a pipe wall will be either measured or known by the welder. Once a thickness of the pipe wall is known, for example, 0.065 inches, the welder will make several coupons in order to determine the best weld parameters. Once several coupons are completed, the welder will cut the pipe along the longitudinal cross section in order to visualize the interior portion of the pipe and more particularly the dimensions of the internal weld beads. The welder will then measure the dimensions of the internal weld using the tool 10. It should be understood that the welder can measure the parameters of the weld bead in any order;

however, for illustrative purposes only the measurements of the convexity, concavity, bead width, and axial alignment will be discussed in that order.

Figure 9A:
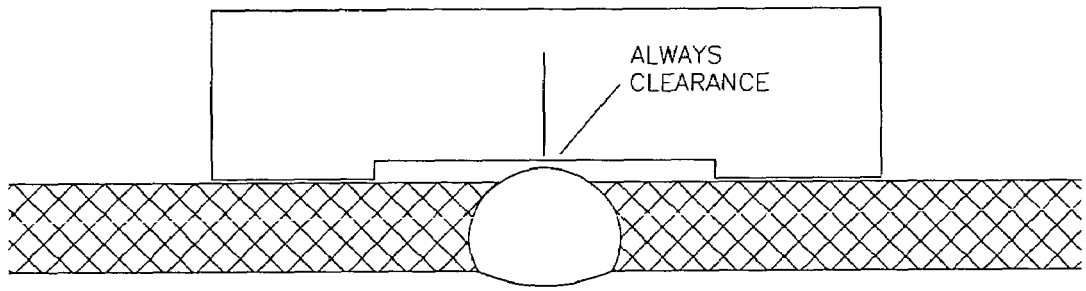
FIG. 9a illustrates measurement of a weld bead with convexity within tolerances.
Figure 9B:
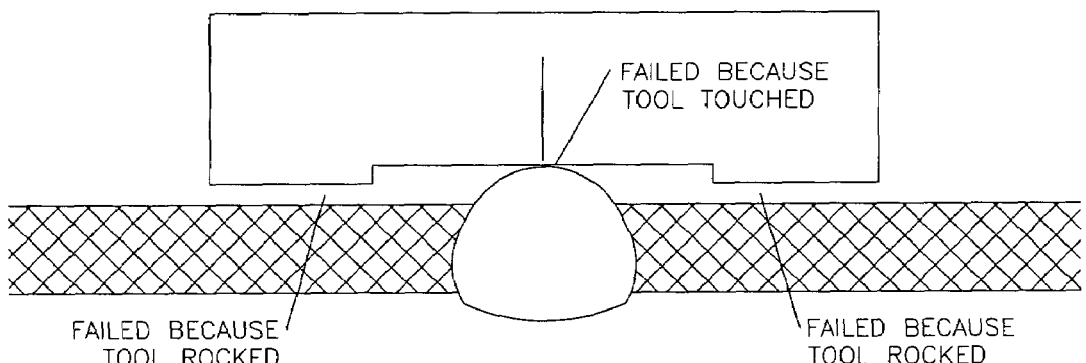
FIG. 9b illustrates measurement of a weld bead with convexity outside of tolerances.

Knowing the wall thickness and minimum and maximum ratios or the predefined fixed dimensions defined by the job specifications, the welder will first determine the proper measurement devices to use associated with the wall thickness on the tool 10. Thereafter, the welder places the associated notch 26 over the weld bead to determine whether the convexity of the weld bead is within prescribed tolerances. If the tool 10 does not rock (i.e., remains stationary) then the convexity of the weld bead is within tolerances. This is shown in FIG. 9a. If tool 10 does rock (i.e., is not stationary), the weld bead convexity is not within the designated tolerances. This is shown in FIG. 9b.

Figure 10A:
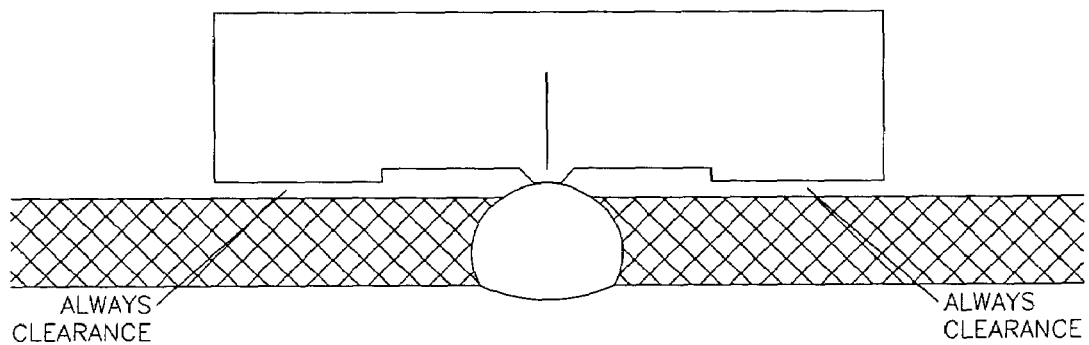
FIG. 10a illustrates measurement of a weld bead with concavity within tolerances.
Figure 10B:
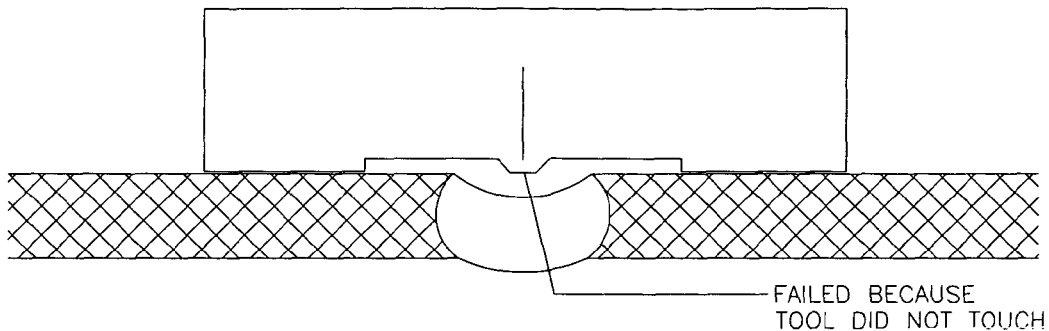
FIG. 10b illustrates measurement of a weld bead with concavity outside of tolerances.

Next, the welder places the associated tooth 28 over the weld bead. If the tool 10 rocks (i.e., is not stationary) then the concavity of the weld bead is within tolerances. This is shown in FIG. 10a. If tool 10 does not rock (i.e., is stationary), then the weld bead concavity is outside of the designated tolerances. This is shown in FIG. 10b.

Figure 11A:
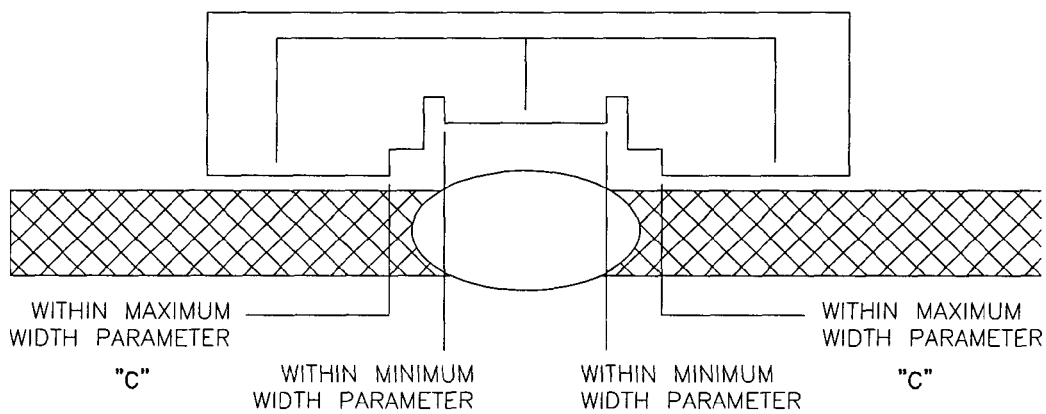
FIG. 11a illustrates measurement of a weld bead with a width inside of tolerances.
Figure 11B:
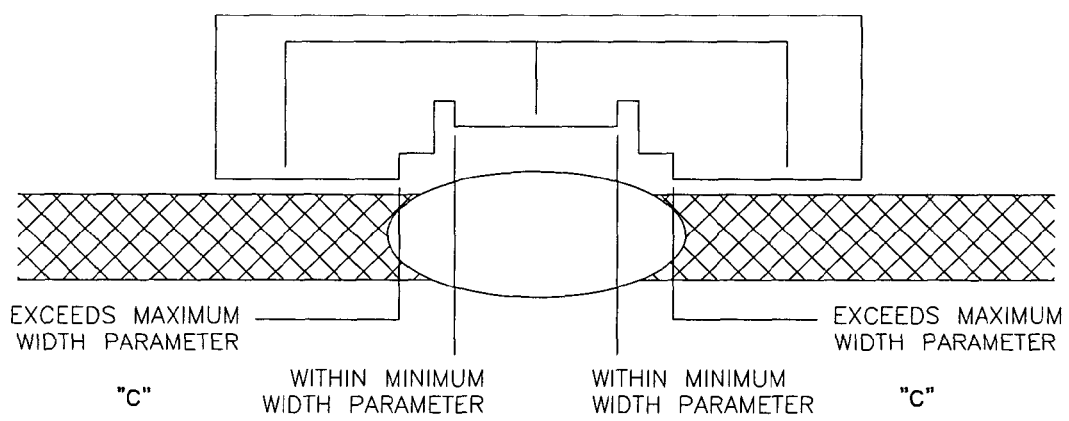
FIG. 11b illustrates measurement of a weld bead that is too wide.
Figure 11C:
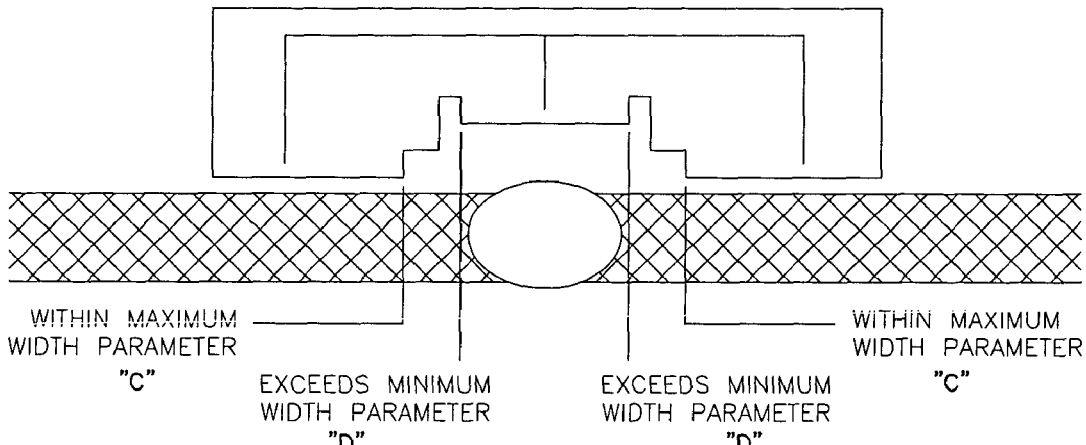
FIG. 11c illustrates measurement of a weld bead that is too narrow.

The welder can then place the associated gap 30 and tab 32 next to the weld bead to determine whether the weld bead width is within tolerances. If the weld bead falls within the dimensions "c" and "d" the welder is then ensured that the bead is within the proper tolerances. This is shown in FIG. 11a. If the weld bead falls outside of dimension "c" (FIG. 11b) or inside of dimension "d" (FIG. 11c), then the weld bead is not within proper width tolerances.

Figure 11D:
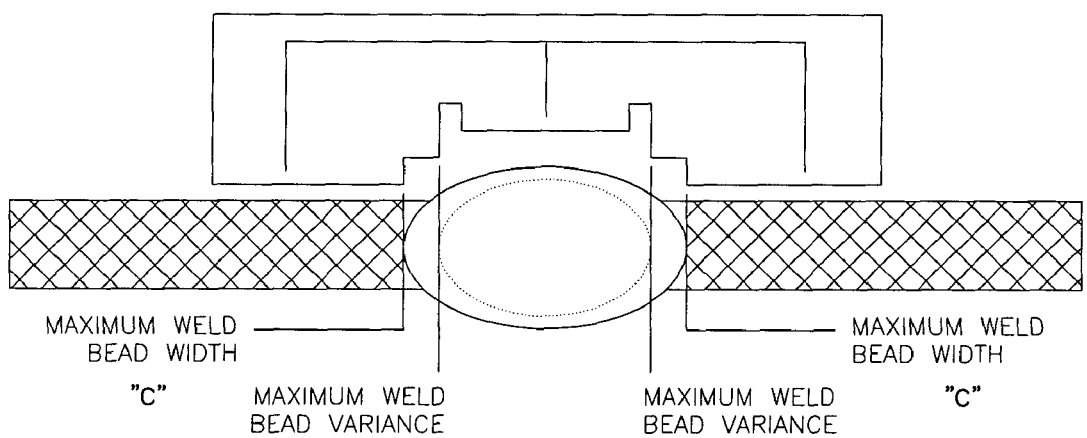
FIG. 11d illustrates measurement of acceptable weld bead width variation where the maximum bead width corresponds to a fixed maximum bead width variation measurement structure.
Figure 11E:
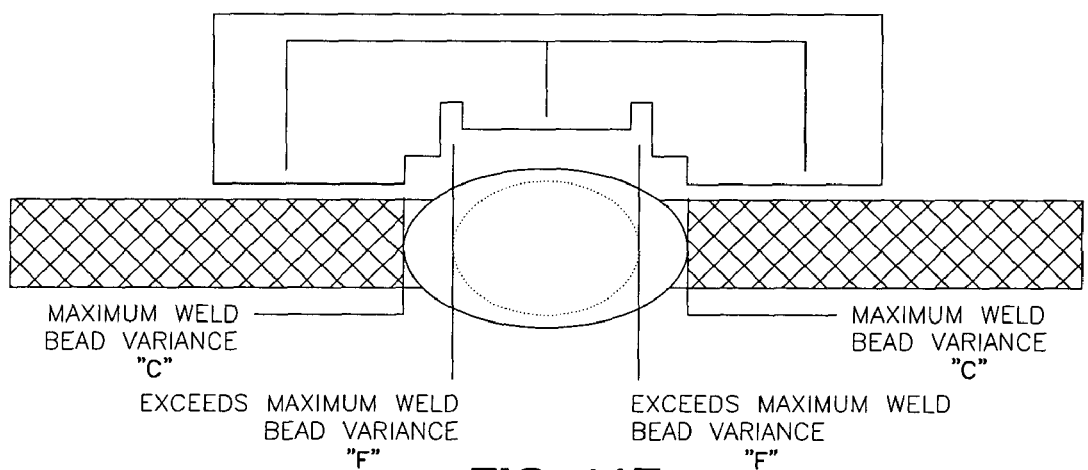
FIG. 11e illustrates measurement of unacceptable weld bead width variation where the maximum bead width corresponds to a fixed maximum bead width variation measurement structure.
Figure 11F:
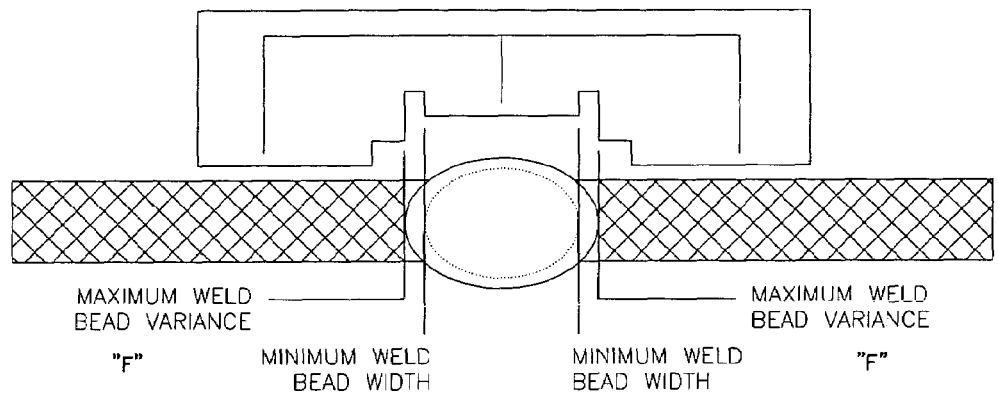
FIG. 11f illustrates measurement of acceptable weld bead width variation where the minimum bead width corresponds to a fixed maximum bead width variation measurement structure.
Figure 11G:
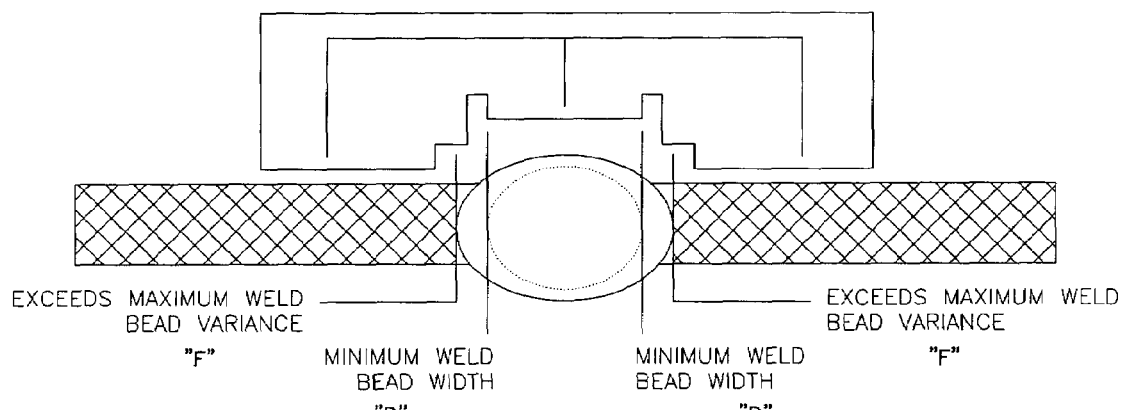
FIG. 11g illustrates measurement of unacceptable weld bead width variation where the minimum bead width corresponds to a fixed maximum bead width variation measurement structure.
Figure 11H:
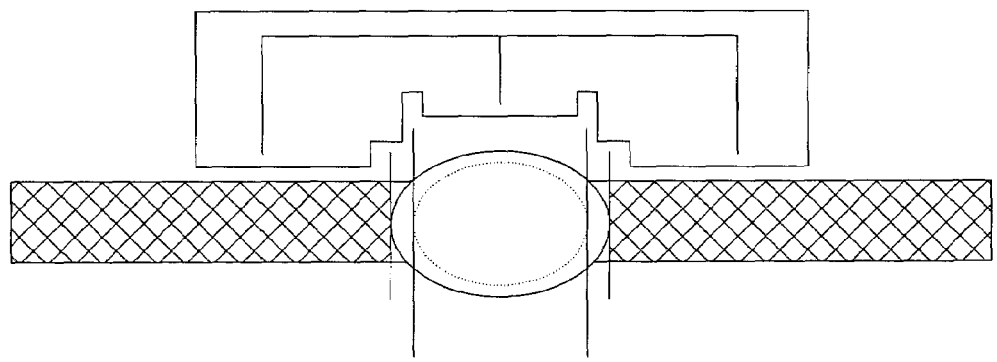
FIG. 11h illustrates use of the tool as a bead width variation reference gauge.

Furthermore, the welder can use step 48 and dimension "f" to verify that the width of the weld bead does not vary beyond proper tolerances. The welder first determines the maximum (or minimum) weld bead width by sliding or intervally placing tool 10 along the weld bead. If the maximum weld bead width corresponds to dimension "c," or the minimum weld bead width corresponds to dimension "f," then the weld bead width must be between dimensions "c" and "f" at all points. Even more specifically, if the maximum weld bead width corresponds to dimension "c," then the minimum weld bead width cannot fall below the dimension "f." This is shown in FIG. 11d, while an unacceptable weld is shown in FIG. 11e. If the maximum weld bead width corresponds to dimension "f," or the minimum weld bead width corresponds to dimension "d," then the weld bead width must be between dimensions "d" and "f" at all points. Even more specifically, if the minimum weld bead width corresponds to dimension "d," then the maximum weld bead width cannot fall outside of dimension "f." This is shown in FIG. 11f, while an unacceptable weld is shown in FIG. 11g. If the maximum and minimum do not correspond to any of dimensions "c," "d," or "f," gap 30, tab 32, and step 48 serve as reference gauges only, as shown in FIG. 11h.

Figure 12A:
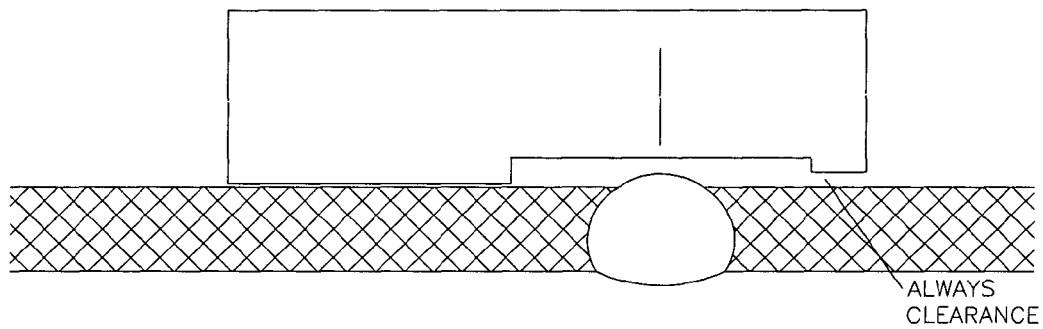
FIG. 12a illustrates measurement of acceptable axial alignment of tubes.
Figure 12B:
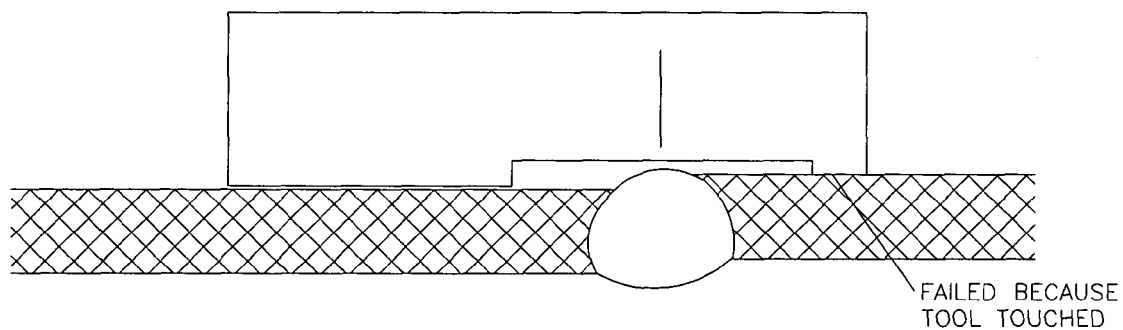
FIG. 12b illustrates measurement of unacceptable axial alignment of tubes.

Finally, the welder places tool 10 at a minimum of at least two positions over the weld bead in order to determine the axial alignment of the pipes. In a first position, for example, tool 10 is placed over the weld bead with recessed portion 38 positioned over the weld bead. If the tool rocks (i.e., is not stationary), as shown in FIG. 12a, the tool will then be rotated 180 degrees with the recessed portion 38 placed over the same position of the weld bead. If the tool still rocks, then it is verified that the pipes are in axial alignment. If tool 10 does not rock (i.e., is stationary) in either position, then the alignment is unacceptable. This same procedure may be used in other locations of the weld bead (preferably at 90 degree increments) in order to determine the axial alignment of the pipes about the diameter thereof. This procedure assumes that the outside diameters of joined pipes are within tolerances of one another.

After these measurements are taken by the welder, the welder can then calibrate the welding machine to the most accurate weld coupon. This procedure allows the welder to visualize the weld bead and make a determination as to whether the weld bead is within certain preset parameters without any complex formulas or tools.

While the invention has been described in terms of its embodiments, those skilled in the art will recognize that the invention can be practiced with modification within the spirit and scope of the appended claims. For example, it should be obvious to one skilled in the art that the tool can be adapted to any tolerances or standards for welds utilizing any pipe wall thickness and ratios or a fixed set of dimensions.

What is claimed is:

1. A tool for measuring parameters, comprising:
a single plate having a surface and a plurality of edges;
at least one fixed measurement structure integrated with an edge of the plurality of edges of the single plate, the at least one fixed measurement structure including:
a recessed portion; and
at least one projection extending upward within the recessed portion and spaced away from a sidewall of the recessed portion forming at least one fixed variation measurement structure.

2. The tool according to claim 1, wherein the at least one fixed variation measurement structure is provided between a sidewall of the projection and an opposing sidewall formed from the recessed portion.

3. The tool according to claim 1, wherein the at least one fixed variation measurement structure includes a first measurement indicia measuring a distance from an edge of the recessed portion to a farthest edge of the at least one projection.

4. The tool according to claim 1, wherein the at least one projection is offset from center within the recessed portion.

5. The tool according to claim 4, wherein the at least one fixed variation measurement structure includes two measurement indicia, a first of the two measurement indicia measuring a distance from a first edge of the recessed portion to a farthest edge from the first edge of the at least one projection and a second of the two measurement indicia measuring a distance from a second edge of the recessed portion to a farthest edge from the second edge of the at least one projection.

6. The tool according to claim 1, further comprising a downslope measuring distance structure.

7. The tool according to claim 6, wherein the downslope measuring distance structure includes a measurement indicia from an edge of the recessed portion to a portion on the plate.

8. The tool according to claim 1, wherein the at least one projection is positioned at least at one sidewall of the recessed portion.

9. The tool according to claim 8, wherein the at least one projection forming the at least one variation measurement structure is two additional projections, each positioned at sidewalls of the recessed portion.

10. The tool according to claim 8, wherein the at least one projection forms a stepped portion at the one sidewall.

11. The tool according to claim 8, wherein the at least one projection provides a narrow recess closer to a bottom portion of the recessed portion with respect to a portion above the at least one projection within the recessed portion.

12. The claim according to claim 8, wherein the at least one projection and recessed portion measures maximum and minimum allowable material thickness of a specific thickness of the material.

13. The tool according to claim 1, wherein the at least one projection is at least two projections spaced apart from one another within the recessed portion, wherein one of the two projections is formed at the sidewall of the recessed portion and the at least two projections form two variation measurement structures.

14. The tool according to claim 1, wherein the at least one projection is four projections, wherein the four projections provide weld bead variation measurements for all wall thicknesses and form at least two variation measurement structures.

15. The tool according to claim 14, wherein:
a first projection of the four projections is positioned at a first sidewall of the recessed portion;
a second projection of the four projections is positioned at an opposing sidewall of the recessed portion; and
a third projection and a fourth projection are spaced apart from one another within the recessed portion and from the first projection and the second projection.

16. A tool for measuring parameters, comprising:
a plate having a surface and a plurality of edges;
at least one fixed measurement structure integrated with an edge of the plurality of edges of the plate, the at least one fixed measurement structure including:
a recessed portion; and
at least one projection extending upward within the recessed portion forming at least one fixed variation measurement structure, wherein:
the at least one projection is four projections, wherein the four projections provide weld bead variation measurements for all wall thicknesses and form at least two variation measurement structures;
a first projection of the four projections is positioned at a first sidewall of the recessed portion;
a second projection of the four projections is positioned at an opposing sidewall of the recessed portion;
a third projection and a fourth projection are spaced apart from one another within the recessed portion and from the first projection and the second projection;
a distance measured between inner sidewalls of the third projection and the fourth projection represent a minimum weld bead dimension and a distance measured between outer sidewalls of the third projection and the fourth projection represent a maximum weld bead variation dimension for the minimum weld bead dimension; and
a distance measured between sidewalls of the recessed portion represent a maximum weld bead dimension and a distance measured between exposed sidewalls of the first projection and the second projection represent a maximum weld bead variation dimension for the maximum weld bead dimension.

17. The tool according to claim 16, wherein:
a space represented between the first minimum weld bead dimension and the maximum weld bead variation dimension is an allowable variation for a weld bead associated with the minimum weld bead dimension; and
a space represented between the maximum weld bead dimension and the maximum weld bead variation dimension is an allowable variation for a weld bead associated with the maximum weld bead dimension.

18. The tool according to claim 1, wherein the at least one projection is six projections, wherein the six projections form a stepped configuration at each sidewall of the recess and provide weld bead variation measurements for all wall thicknesses.

19. The tool according to claim 1, wherein the recessed portion is a stepped configuration forming at least two stepped portions.

20. The tool according to claim 1, wherein the recessed portion is a stepped configuration forming a portion lower than remaining portions of the recessed portion.

21. The tool according to claim 1, wherein the at least one fixed measurement structure measures at least one of weld bead overlap, weld downslope, allowable maximum and minimum weld bead variation, allowable material thickness variation, convexity and concavity.

22. A method for measuring a maximum and minimum allowable material thickness using a tool having a recessed portion with a stepped configuration, the method comprising the steps of:
placing a first portion of the recessed portion over a thickness of the material;
navigating the first portion over portions of the material;
determining whether the first portion slips over the thickness of the material and, if so, then the material thickness is within allowable thickness variation; and
determining whether the material enters a second, narrower portion of the recessed portion and, if not, then the material thickness is within allowable thickness variation.

23. A method of measuring bead overlap, comprising the steps of:
measuring a bead width at a certain location by placing a structure with edges near the bead;
rotating the structure approximately 90 degrees;
placing the structure lengthwise across the bead;
aligning one of the edges of the structure with an outside edge of a weld bead at about the certain location; and
counting an amount of bead overlaps between the edges of the structure.

24. The method of claim 23, comprising the step of centering the structure over the bead when placing the structure lengthwise.

25. A tool for measuring parameters, comprising:
a plate having a surface and a plurality of edges;
at least one fixed measurement structure integrated with an edge of the plurality of edges of the plate, the at least one fixed measurement structure including:
a recessed portion with opposing sidewalls; and
a downslope measuring indicia or structure provided remotely from both of the opposing sidewalls of the recessed portion.

* * * * *